(12) United States Patent  
Umeno

(10) Patent No.: US 9,306,328 B2
(45) Date of Patent: Apr. 5, 2016

(54) POWER CONNECTOR

(71) Applicant: MICROSOFT TECHNOLOGY LICENSING, LLC, Redmond, WA (US)

(72) Inventor: Hiroo Umeno, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/095,887

(22) Filed: Dec. 3, 2013

(65) Prior Publication Data

US 2014/0087581 A1   Mar. 27, 2014

Related U.S. Application Data

(63) Continuation of application No. 14/034,334, filed on Sep. 23, 2013, now Pat. No. 8,622,629, which is a continuation of application No. 13/070,331, filed on Mar. 23, 2011, now Pat. No. 8,596,881.

(60) Provisional application No. 61/421,587, filed on Dec. 9, 2010.

(51) Int. Cl.
*G02B 6/38* (2006.01)
*H01R 13/629* (2006.01)
*H01R 11/30* (2006.01)
*H01R 13/62* (2006.01)
*H01B 11/22* (2006.01)

(52) U.S. Cl.
CPC ............ *H01R 13/629* (2013.01); *G02B 6/3817* (2013.01); *G02B 6/3897* (2013.01); *H01B 11/22* (2013.01); *H01R 11/30* (2013.01); *H01R 13/6205* (2013.01)

(58) Field of Classification Search
CPC .... G02B 6/3817; G02B 6/3897; G02B 6/403; G02B 6/3886; H01B 11/22
USPC .............................. 385/53–60, 75, 78; 438/38
See application file for complete search history.

(56) References Cited

U.S. PATENT DOCUMENTS

| 4,193,657 | A | * | 3/1980 | Slone | 439/598 |
| 5,192,229 | A | * | 3/1993 | Clark et al. | 439/604 |
| 5,700,161 | A | * | 12/1997 | Plummer et al. | 439/587 |
| 5,784,511 | A | | 7/1998 | Kikuchi et al. | |

(Continued)

FOREIGN PATENT DOCUMENTS

| BE | 1018472 A5 | 12/2010 |
| CN | 101681186 A | 3/2010 |

(Continued)

OTHER PUBLICATIONS

Badescu, M. et al., "Novel Smart Connector for Modular Robotics," Advanced Intelligent Mechatronics, 2001, IEEE/ASME International Conference, Jul. 2001, 8 pages.

(Continued)

*Primary Examiner* — Ellen Kim
(74) *Attorney, Agent, or Firm* — Judy Yee; Micky Minhas

(57) ABSTRACT

A power and data connector includes an extension that protrudes from a lip surface. The extension is configured to mate with an electronic device. A connection surface at a terminal end of the extension separately surrounds openings, through which power interfaces extend.

20 Claims, 3 Drawing Sheets

(56) References Cited

U.S. PATENT DOCUMENTS

| | | |
|---|---|---|
| 5,867,621 A | 2/1999 | Luther et al. |
| 6,305,992 B1 | 10/2001 | Bouda et al. |
| 6,361,342 B1 * | 3/2002 | Cox ................................ 439/275 |
| 6,705,880 B2 * | 3/2004 | Rhude ............................ 439/144 |
| 7,001,201 B1 | 2/2006 | Peng |
| 7,070,458 B2 | 7/2006 | Axenböck et al. |
| 7,311,526 B2 | 12/2007 | Rohrbach et al. |
| 7,329,128 B1 | 2/2008 | Awad |
| 7,351,066 B2 | 4/2008 | DiFonzo et al. |
| 7,361,059 B2 | 4/2008 | Harkabi et al. |
| 7,658,613 B1 | 2/2010 | Griffin et al. |
| 7,708,564 B2 | 5/2010 | Fogg et al. |
| 7,722,358 B2 | 5/2010 | Chatterjee et al. |
| 7,748,996 B2 | 7/2010 | Wang et al. |
| 7,794,263 B1 | 9/2010 | Kim et al. |
| 7,841,776 B2 | 11/2010 | DiFonzo et al. |
| D632,261 S | 2/2011 | Andre et al. |
| 7,901,216 B2 | 3/2011 | Rohrbach et al. |
| 8,138,717 B2 | 3/2012 | Chatterjee et al. |
| D684,538 S | 6/2013 | Akana et al. |
| 8,974,241 B2 * | 3/2015 | Finona et al. ................. 439/271 |
| 2002/0098718 A1 * | 7/2002 | Harmon et al. ................. 439/35 |
| 2003/0068135 A1 | 4/2003 | Watanabe et al. |
| 2004/0209489 A1 | 10/2004 | Clapper |
| 2005/0255719 A1 | 11/2005 | Heidlein |
| 2006/0097852 A1 | 5/2006 | Lammers et al. |
| 2006/0145663 A1 | 7/2006 | Shiff et al. |
| 2007/0072442 A1 | 3/2007 | DiFonzo et al. |
| 2007/0116414 A1 | 5/2007 | Penumatcha et al. |
| 2007/0141860 A1 | 6/2007 | Hernandez et al. |
| 2008/0003841 A1 | 1/2008 | Su et al. |
| 2009/0297099 A1 | 12/2009 | Benjamin et al. |
| 2010/0080563 A1 | 4/2010 | DiFonzo et al. |
| 2010/0102915 A1 | 4/2010 | Rhodes et al. |
| 2011/0167187 A1 | 7/2011 | Crumlin et al. |
| 2012/0148196 A1 | 6/2012 | Penumatcha et al. |
| 2012/0203292 A1 * | 8/2012 | Deininger et al. ................. 607/2 |
| 2013/0170794 A1 | 7/2013 | DiFonzo et al. |

FOREIGN PATENT DOCUMENTS

| | | |
|---|---|---|
| EP | 2284958 A1 | 2/2011 |
| JP | 509990 B1 | 4/1975 |
| JP | 5841985 U | 3/1983 |
| JP | S63274070 A | 11/1988 |
| JP | 07006817 A | 1/1995 |
| JP | 2000021474 A | 1/2000 |
| JP | 3107377 U | 2/2005 |
| JP | 2005128821 A | 5/2005 |
| JP | 2009282531 A | 12/2009 |

OTHER PUBLICATIONS

Inniss, B., "A Novel Power & Communication Bus Concept," Twenty-Second International Telecommunications Energy Conference, Sep. 2000, pp. 224-230.

ISA Korean Intellectual Property Office, International Search Report and Written Opinion of PCT/US2011/063339, Jul. 27, 2012, 8 pages.

State Intellectual Property Office of the People's Republic of China, Search Report Issued in Application No. 201110408231.2, Dec. 30, 2013, 9 pages.

European Patent Office, Extended European Search Report Issued in Application No. EP11846102.9, May 12, 2014, 7 pages.

State Intellectual Property Office of the People's Republic of China, Second Office Action Issued in Application No. 201110408231.2, Sep. 2, 2014, 7 pages.

State Intellectual Property Office of the People's Republic of China, Third Office Action Issued in Chinese Patent Application No. 201110408231.2, May 12, 2015, 7 Pages.

Japanese Patent Office, Office Action Issued in Japanese Patent Application No. 2013-543238, Jul. 13, 2015, 9 pages.

State Intellectual Property Office of the People's Republic of China, 4th Office Action Issued in Patent Application No. 201110408231.2, Sep. 21, 2015, 8 pages.

Japan Patent Office, Office Action issued in Japanese Patent Application No. 2013543238, Nov. 16, 2015, Japan, 9 pages.

European Patent Office, Office Action issued in European Patent Application No. 11846102.9, Dec. 22, 2015, Netherlands, 4 pages.

\* cited by examiner

POWER CONNECTOR

CROSS REFERENCE TO RELATED APPLICATIONS

This application is a continuation of U.S. patent application Ser. No. 14/034,334 filed Sep. 23, 2013, which is a continuation of U.S. patent application Ser. No. 13/070,331, filed Mar. 23, 2011, now U.S. Pat. No. 8,596,881, which claims priority to U.S. Provisional Patent Application No. 61/421,587, filed Dec. 9, 2010, the entirety of each of which are hereby incorporated herein by reference.

BACKGROUND

Electronic devices often have one or more interfaces for receiving electrical power and/or data. The design of such interfaces has a profound effect on functional and aesthetic aspects of the electronic device.

SUMMARY

A power and data connector includes an extension that protrudes from a lip surface. The extension is configured to mate with an electronic device. A connection surface at a terminal end of the extension separately surrounds openings, through which power interfaces extend.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
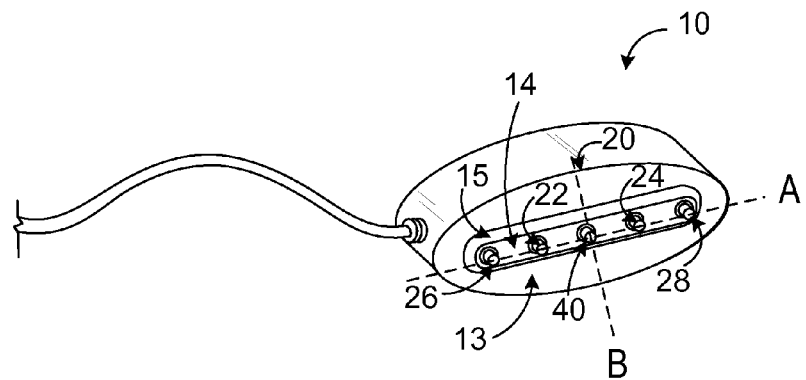
FIG. 1 shows a power and data connector in accordance with an embodiment of the present disclosure.

FIG. 1 shows a nonlimiting example of a power and data connector 10. Power and data connectors in accordance with the present disclosure, such as power and data connector 10, provide a mechanically simple and aesthetically pleasing mechanism for delivering power and/or data to and/or from an electronic device, such as electronic device 12 of FIG. 2.

Figure 2:
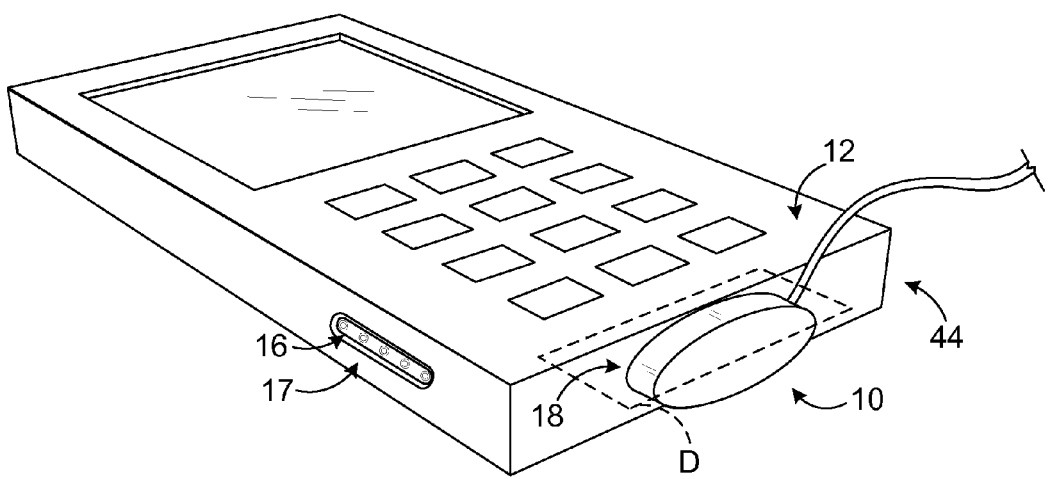
FIG. 2 shows an electronic device including a plurality of connector receptors configured to selectively couple with the power and data connector of FIG. 1.

As described in more detail below, power and data connectors in accordance with the present disclosure include a planar connection surface that is substantially flat and protrudes in front of the rest of the power and data connector. For example, FIG. 1 shows an example planar connection surface 14 of power and data connector 10. The planar connection surface is designed to mate with a planar receptor surface of the electronic device. FIG. 2 shows an example planar receptor surface 16 of electronic device 12. FIG. 1 also shows a lip surface 13 and a tapered extension 15. The tapered extension 15 protrudes from the lip surface 13, and the planar connection surface 14 is located at a terminal end of the tapered extension.

Magnetic attractors of the power and data connector and the electronic device magnetically hold the planar connection surface in place relative to the planar receptor surface. FIG. 2 shows power and data connector 10 magnetically held in place relative to a planar receptor surface (hidden by power and data connector 10). When held in this manner, various power interfaces and/or optical or electrical data interfaces of the power and data connector are operatively coupled to complementary power interfaces and optical data interfaces of the electronic device. As such, power and/or data may be transferred to and/or from the electronic device via the power and data connector.

Because the connector surface and the receptor surface are planar and magnetic force is used to hold the power and data connector to the electronic device, the electronic device can be designed with a substantially smooth surface. It is believed that the substantially smooth surface allowed by the herein disclosed power and data connector is aesthetically pleasing, is resistant to mechanical failures associated with mechanically complicated designs, is easy to keep clean, and provides countless other benefits.

Planar connection surface 14 is symmetrical about a first axis A and symmetrical about a second axis B that is perpendicular to axis A. Axis A and axis B are perpendicular to a connection axis C (shown in FIG. 3) of the planar connection surface. The symmetrical shape of the planar connection surface allows the power and data connector to be connected to an electronic device in either of at least two different orientations. In other words, the power and data connector may be connected with a first orientation or a second orientation that is rotated one hundred eighty degrees relative to the first orientation.

Figure 4:
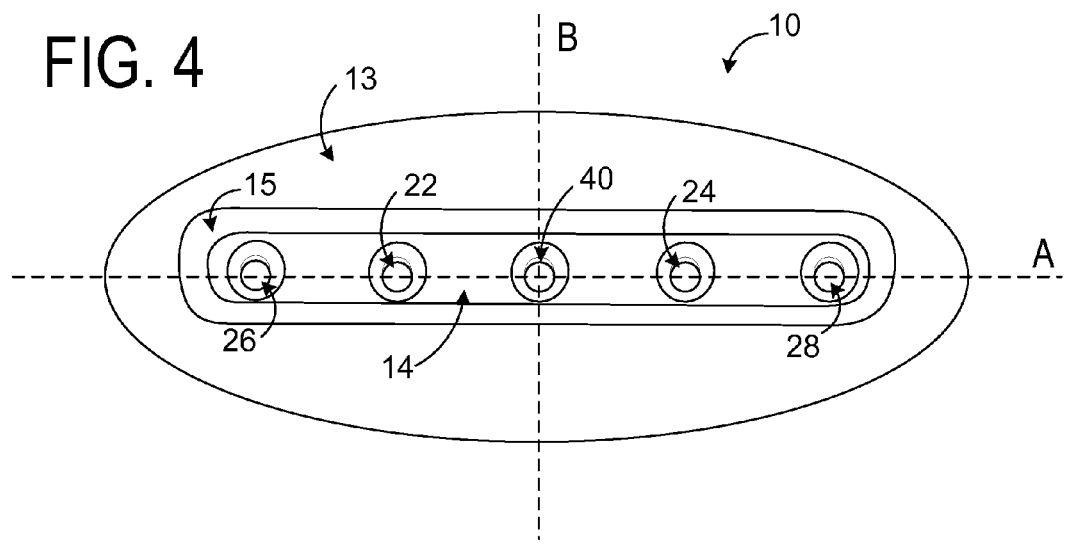

Power and data connectors in accordance with the present disclosure may include one or more pairs of power interfaces. Such power interfaces may be electrical conductors, for example. In the illustrated example, power and data connector 10 includes a first power interface 22 and a second power interface 24 on planar connection surface 14. As shown in FIGS. 1 and 4, first power interface 22 and second power interface 24 are aligned with axis A. Furthermore, first power interface 22 and second power interface 24 are each spaced the same distance away from axis B so that the first power interface and the second power interface are symmetrical about axis B.

Each power interface is configured to operatively couple with a complementary power interface of a power and data connector receptor such that electrical power is transferred between the first power interface and the complementary power interface. As one nonlimiting example, one power interface may be held at a first voltage and the other power interface may be held at a different voltage such that a voltage differential is established for providing a direct current for powering an electronic device. The symmetrical arrangement of the power interfaces allows the power and data connector to be orientation agnostic.

Power and data connectors in accordance with the present disclosure may include one or more power interfaces configured to ground the power and data connector. In the illustrated example, power and data connector 10 includes a ground power interface 26 and a ground power interface 28. In other embodiments, the planar connection surface or another aspect of the power and data connector may be used to ground the power and data connector.

In the illustrated embodiment, power and data connector 10 includes two working power interfaces for establishing a DC voltage and two ground power interfaces for grounding the power and data connector. However, power and data connectors may include virtually any number of working and/or grounding power interfaces without departing from the scope of this disclosure.

Figure 3:
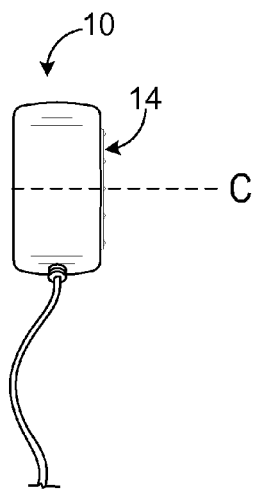
FIGS. 3 and 4 show the power and data connector of FIG. 1.

As shown in FIG. 3, the power interfaces may extend parallel to connection axis C past the planar connection surface 14 and all other portions of the power and data connector. In other words, the power interfaces may be the forward most aspect of the power and data connector. In other embodiments, the power interfaces may be recessed into the planar connection surface parallel to the connection axis C. As discussed below, optical interface(s) may extend or recede similar to the power interfaces. In general, the amount of extension and/or recession will be relatively minor—e.g., less than two millimeters. Further, any extension and/or recession may be accommodated by complementary recession and/or extension of the power and data connector receptor, such that reliable connections can be established between the power and data connector and the electronic device.

Figure 5:
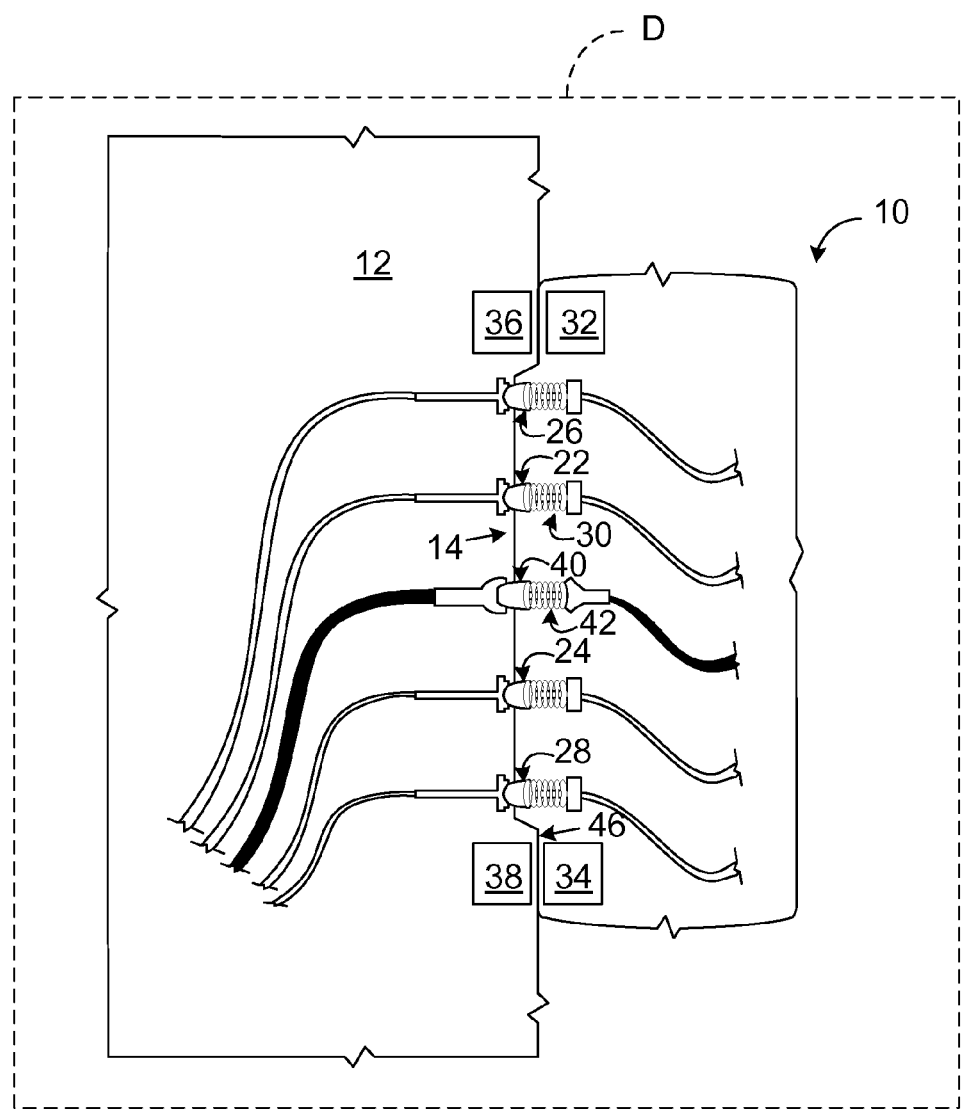
FIG. 5 shows a schematic cross section of the power and data connector of FIG. 1 coupled to the electronic device of FIG. 2.

FIG. 5 shows a cross-sectional view of a plane D, which is illustrated in FIG. 2. As shown in FIG. 5, a power interface, such as power interface 22, may be operatively connected to a connection assistant 30. Connection assistant resiliently biases the power interface past the planar connection surface 14 parallel to connection axis C. The connection assistant provides the power interface with a variable amount of extension so that a solid contact may be made with a complementary power interface of the electronic device. In some embodiments, the electronic device may alternatively or additionally include a connection assistant to resiliently bias the power interfaces of the electronic device. The connection assistant may include a spring in some embodiments.

As shown in FIG. 5, power and data connector 10 includes a first magnetic attractor 32 and a second magnetic attractor 34 that are configured to cooperate with magnetic attractor 36 and magnetic attractor 38 of electronic device 12 to magnetically hold the power and data connector 10 in place relative to the electronic device. The magnetic attractors may be flush with or recessed behind the planar connection surface 14, as shown in FIG. 5. In some embodiments, one or more magnetic attractors may alternatively or additionally be flush with or recessed behind the lip surface and/or the tapered extension. In some embodiments, the magnetic attractors may include a permanent magnet and/or an electromagnet. While the illustrated embodiment shows a power and data connector that includes two magnetic attractors, it is to be understood that virtually any number of magnetic attractors may be used without departing from the scope of this disclosure.

Power and data connectors in accordance with the present disclosure may include one or more electrical or optical interfaces configured to transmit data signals. In the illustrated example, power and data connector 10 includes optical interface 40 in the form of an optical fiber connector that terminates a fiber optic cable capable of transmitting data signals in the form of light.

As shown in FIG. 4, optical interface 40 is aligned with axis A and axis B at a center of planar connection surface 14. In some embodiments, a pair of optical interfaces may be aligned with axis A and spaced the same distance away from axis B so that the pair of optical interfaces are symmetrical about axis B.

Like the power interfaces, the optical interface is configured to operatively couple with a complementary optical interface of a power and data connector receptor. In this way, optical signals may be transferred between the optical interface of the power and data connector and the complementary optical interface of the electronic device.

As shown in FIG. 5, optical interface 40 may be operatively connected to a connection assistant 42 resiliently biasing that optical interface past planar connection surface 14.

Turning back to FIG. 2, electronic device 12 includes a housing 44 and a plurality of power and data connector receptors to selectively couple with power and data connectors. In the illustrated embodiment, electronic device includes an empty power and data connector receptor 17 and a power and data connector receptor 18 that is occupied by power and data connector 10. A device may include virtually any number of power and data connector receptors without departing from the scope of this disclosure.

The power and data connector receptors may be formed as an integral part of the device chassis or housing so that there is not a separate user-visible connector housing. Furthermore, the power and data connector may include a tapered opening that recedes to the planar receptor surface at its terminal end. The tapered opening may be sized and shaped to mate with the tapered extension of the power and data connector. The tapered arrangement helps guide the power and data connector into a mated arrangement with the power and data connector receptor in either of two orientations (i.e., 180 degree rotation). In the mated arrangement, the magnetic attractors can hold the power and data connector in place.

The power and data connector receptors may be located at different sites around housing 44. An auxiliary device or power source may be connected to any of the different connector receptors via a power and data connector, thus providing connection flexibility that may facilitate using the electronic device in a desired orientation, with a desired case or covering, and/or with a desired grip.

Furthermore, when plural connector receptors are included in the same electronic device, two or more auxiliary devices (or an auxiliary device and a power source) may be simultaneously connected to the electronic device via different power and data connectors. In such cases, the plurality of connector receptors may be operatively connected to one another such that power received via one connector receptor may be output via another connector receptor; and data received via an optical interface of one connector receptor may be output via an optical interface of another connector receptor. In this way, power and/or data may not only be delivered to the electronic device, but also through the electronic device to another auxiliary device.

In general, each power and data connector receptor may be configured to complement the power and data connector. As such, each of the plurality of power and data connector receptors may include a receptor surface 16. In some embodiments, the receptor surface may be planar. Furthermore, the receptor surface may be recessed less than six millimeters from the housing so as to provide a substantially continuous and uninterrupted surface from the housing and across the connector receptor. The overall smoothness of the connector receptor in relation to the housing provides a clean appearance that does not include any protrusions that can be easily broken or large gaps into which debris and other contaminants may collect. The overall smoothness is also thought to produce an aesthetically pleasing appearance.

Like the corresponding planar connection surface of the power and data connector, the connector receptor may be substantially symmetrical. Furthermore, the connector receptor may include power interfaces and/or optical interfaces positioned to align with the corresponding power interfaces and optical interfaces of the power and data connector when the power and data connector is magnetically held to the electronic device. To facilitate such magnetic holding, the connector receptor may include one or more magnetic attractors flush with or recessed behind the receptor surface.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A power and data connector, comprising:
 a lip surface;
 an extension protruding from the lip surface, the extension configured to mate with an electronic device;
 a connection surface at a terminal end of the extension, the connection surface being functionally symmetrical about a first axis and functionally symmetrical about a second axis perpendicular to the first axis, the first axis and the second axis being perpendicular to a connection axis of the connection surface, the connection surface surrounding separate first and second openings equally spaced from the second axis;
 a first power interface extending through the first opening, the first power interface aligned with the first axis; and
 a second power interface extending through the second opening, the second power interface aligned with the first axis.

2. The power and data connector of claim 1, where the extension is configured to cooperate with one or more corresponding magnetic attractors of the electronic device to hold the power and data connector to the electronic device via magnetic force.

3. The power and data connector of claim 2, where the extension includes a magnet.

4. The power and data connector of claim 3, where the extension includes a permanent magnet.

5. The power and data connector of claim 1, where the extension includes a magnetically attractable material.

6. The power and data connector of claim 1, where the connection surface is planar.

7. The power and data connector of claim 1, where a portion of the connection surface is between the first and second openings.

8. A connector, comprising:
 a lip surface;
 an extension protruding from the lip surface, the extension configured to mate with an electronic device;
 a connection surface at a terminal end of the extension, the connection surface being functionally symmetrical about a first axis and functionally symmetrical about a second axis perpendicular to the first axis, the first axis and the second axis being perpendicular to a connection axis of the connection surface, the connection surface surrounding separate first and second openings;
 a first power interface extending through the first opening, the first power interface aligned with the first axis; and
 a second power interface extending through the second opening, the second power interface aligned with the first axis, the first power interface and the second power interface equally spaced from the second axis.

9. The connector of claim 8, where the extension is configured to cooperate with one or more corresponding magnetic attractors of the electronic device to hold the power and data connector to the electronic device via magnetic force.

10. The connector of claim 9, where the extension includes a magnet.

11. The connector of claim 9, where the extension includes a permanent magnet.

12. The connector of claim 9, where the extension includes a magnetically attractable material.

13. The connector of claim 8, where the connection surface is planar.

14. The connector of claim 8, where a portion of the connection surface is between the first and second openings.

15. A connector, comprising:
 a lip surface;
 an extension protruding from the lip surface, the extension configured to mate with an electronic device;
 a planar connection surface at a terminal end of the extension, the connection surface being functionally symmetrical about a first axis and functionally symmetrical about a second axis perpendicular to the first axis, the first axis and the second axis being perpendicular to a connection axis of the connection surface, the connection surface surrounding separate first and second openings;
 a first power interface extending through the first opening, the first power interface aligned with the first axis; and
 a second power interface extending through the second opening, the second power interface aligned with the first axis, the first power interface and the second power interface equally spaced from the second axis.

16. The connector of claim 15, where the extension is configured to cooperate with one or more corresponding magnetic attractors of the electronic device to hold the power and data connector to the electronic device via magnetic force.

17. The connector of claim 16, where the extension includes a magnet.

18. The connector of claim 16, where the extension includes a permanent magnet.

19. The connector of claim 16, where the extension includes a magnetically attractable material.

20. The connector of claim 15, where a portion of the connection surface is between the first and second openings.

* * * * *